US012235967B1

(12) United States Patent
Cohen et al.

(10) Patent No.: US 12,235,967 B1
(45) Date of Patent: *Feb. 25, 2025

(54) EXTENDING MEASURED BOOT FOR SECURE LINK ESTABLISHMENT

(71) Applicant: Amazon Technologies, Inc., Seattle, WA (US)

(72) Inventors: Ori Cohen, Atlit (IL); Barak Wasserstrom, Mitzpe Aviv (IL); Andrew Robert Sinton, Jerusalem (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,868

(22) Filed: May 25, 2023

Related U.S. Application Data

(63) Continuation of application No. 17/305,135, filed on Jun. 30, 2021, now Pat. No. 11,709,941.

(51) Int. Cl.
| H04L 29/06 | (2006.01) |
| G06F 21/57 | (2013.01) |
| H04L 9/30 | (2006.01) |
| H04L 9/32 | (2006.01) |

(52) U.S. Cl.
CPC .......... *G06F 21/575* (2013.01); *H04L 9/3073* (2013.01); *H04L 9/3265* (2013.01); *G06F 2221/034* (2013.01)

(58) Field of Classification Search
CPC ............ G06F 21/575; G06F 2221/034; H04L 9/3073; H04L 9/3265
See application file for complete search history.

(56) References Cited

U.S. PATENT DOCUMENTS

| 9,749,141 | B2* | 8/2017 | Keidar | ................ H04L 9/3263 |
| 11,709,941 | B1* | 7/2023 | Cohen | ................ H04L 63/0823 |
| 2013/0031371 | A1* | 1/2013 | McLellan | ............ G06F 21/575 |
| | | | | 713/182 |
| 2013/0298210 | A1* | 11/2013 | Wright | ................ G06F 9/4416 |
| | | | | 718/1 |
| 2019/0220602 | A1* | 7/2019 | Ruan | ...................... G06F 21/64 |
| 2021/0056058 | A1* | 2/2021 | Lee | ...................... G06F 13/4221 |
| 2022/0100862 | A1* | 3/2022 | Vetter | ................ G06F 21/575 |

OTHER PUBLICATIONS

Sabt et al., "Trusted Execution Environment: What It is, and What It is Not", 2015 IEEE Trustcom/BigDataSE/ISPA,, Date of Conference: Aug. 20-22, 2015.*

(Continued)

*Primary Examiner* — Morshed Mehedi
(74) *Attorney, Agent, or Firm* — Weaver Austin Villeneuve & Sampson LLP (57) ABSTRACT

A modified measured boot approach is utilized for establishing a secure communication link between two devices. Each device may execute a respective boot process until the device reaches the stage responsible for establishing the communication link with the other device. Each device may exchange its respective self-signed certificate and extend its certificate chain with the self-signed certificate received from the other device. A secure link can be established using the public key of the other device as a based key for a key exchange protocol.

20 Claims, 7 Drawing Sheets

(56) References Cited

OTHER PUBLICATIONS

Arias, O., et al., "Privacy and Security in Internet of Things and Wearable Devices", IEEE Transactions on Multi-Scale Computing Systems, Apr. 1-Jun. 2015, vol. 1(2), pp. 99-109.
U.S. Notice of Allowance dated Mar. 6, 2023 in U.S. Appl. No. 17/305,135.
U.S. Restriction Requirement dated Nov. 1, 2022 in U.S. Appl. No. 17/305,135.

\* cited by examiner

EXTENDING MEASURED BOOT FOR SECURE LINK ESTABLISHMENT

CROSS-REFERENCE TO RELATED APPLICATIONS

This application is a continuation of U.S. patent application Ser. No. 17/305,135, filed Jun. 30, 2021, issued as U.S. Pat. No. 11,709,941 on Jul. 25, 2023, and titled "EXTENDING MEASURED BOOT FOR SECURE LINK ESTABLISHMENT," the content of which is incorporated herein by reference in its entirety.

BACKGROUND

Computer security generally relies on establishing a chain of trust by validating different components of a system before allowing communication between the components. In the verified boot approach, the chain of trust can be established by each software image in a boot sequence verifying the next software image before handing the control over. When the next software image cannot be verified, the boot process may not continue, and the chain of trust cannot be established. In the measured boot approach, measurements of each software image are logged, and the boot process can continue without verifying the integrity of the boot stages. The chain of trust can be established through verifying and attesting the measurement logs by a central management entity.

BRIEF DESCRIPTION OF THE DRAWINGS

Various embodiments in accordance with the present disclosure will be described with reference to the drawings, in which.

DETAILED DESCRIPTION

In certain systems, multiple devices can be connected to operate as a single device to enhance the performance of the system. For example, applications such as artificial intelligence (AI), networking, cloud computing, high-performance computing (HPC), Internet of Things (IoT), or web hosting, among others, may demand higher performance, and therefore, two or more system-on-chips (SoCs), central processing units (CPUs), or graphical processing units (GPUs) may be coupled together to be used as a single device. These components may exchange data over an interconnect. As an example, SoCs may exchange input/output (I/O) data over a PCIe bus, or the CPUs may exchange data over a compute express link (CXL) or other suitable interconnects.

However, the connection between these devices can be prone to security threats because the connection can provide a surface of attack by exposing the devices to external interfaces. For example, two or more SoCs can be connected via a fabric or an interconnect, which can provide a unified memory space or address range that can be accessed by any of the components of the SoCs. However, connecting the SoCs in such a manner may allow an external entity access to the internal address space of the SoCs. In some cases, the data originating from an internal transaction may not be differentiated easily from the I/O data originating from an external entity. Thus, in some cases, an adversary software executing on one of the SoCs that has bypassed the secured boot process may access the internal address space of the system without being detected. Thus, it is desirable to establish an encrypted and authenticated connection between the devices for communication over a link.

A public key cryptography (PKC) based solution can be used for authentication and validation of the devices. The PKC relies on a public and a private key pair. A certificate authority (CA) can issue digital certificates that can bind devices or entities with respective public keys. The identity of a device or an entity can be verified using the corresponding digital certificate which may be stored and signed by the CA. For example, the CA can sign the public keys for the two devices using its own private key. The two devices can exchange their signed public keys which can be verified using the CA public key. Thus, the trust on the validity of the devices may rely on the trust on the CA. However, in some instances, the CA can be compromised, and/or fraudulent certificates can be issued due to malware injection or other type of attacks.

Certain systems may rely on a PKC-protected boot sequence prior to establishing a communication link between the devices to ensure authenticity and integrity of the devices. In the secured boot or verified boot approach, a chain of trust can be established by verifying the signature of each software image in the boot sequence before loading that software image. Each software image may correspond to a boot stage in the boot process. In certain examples, a public key can be stored in the device (e.g., in the fuses or in a boot ROM), which may initiate the chain of trust for the device. Each software image may have been signed using its respective private key (e.g., manufacturer or vendor specific), and the signature of each image can be verified using the public key.

An example boot sequence may include multiple boot stages, e.g., a boot ROM, a boot loader, an operating system (OS), an OS kernel, and user application(s). Each boot stage may verify the next boot stage before handing the control over. For example, the boot ROM may verify a signature of the boot loader using the public key before loading the boot loader. The boot loader may verify the signature of the OS before loading the OS, and so on. If the signature of a software image cannot be verified, that software image may not be loaded, and the boot process cannot continue, which may be beneficial when a malicious software is injected into the boot sequence. However, in some cases, a software image may not be loaded due to an operational error or a bug, and therefore, the booting process may halt, and the device may become inaccessible. This scenario may not be desirable from the operational perspective. Additionally, relying on a CA, which is external to device, for maintaining and protecting a private key for each software image can also be a burden from the operational perspective. Some of these drawbacks of the secured boot approach can be avoided using the measured boot approach.

In the measured boot approach, the root of trust can be in a cryptographic hardware (e.g., a trusted platform module (TPM), a security processor, or another secured hardware component), which may include a private/public key pair. The cryptographic hardware can be part of the device or an independent entity. Prior to loading a software image for each boot stage, that software image can be measured, and the measurements can be recorded (e.g., in the platform configuration registers (PCRs) or other registers) to be used for attestation at a later stage. Measuring a software image may imply computing a hash of the software image based on a secure hash algorithm (e.g., SHA-1 or SHA-2). The measurements for each boot stage can also be recorded in a boot log along with information associated with each boot stage. Unlike the secured boot approach, the boot process in the measured boot approach can continue without verifying the integrity of various boot stages. As an example, if malicious software is loaded as part of the boot process, the measurements of this malicious software may be recorded and cannot be corrected at a later stage. Since each boot stage loads the next boot stage, the measurements may be accumulated for all the boot stages including the one affected by the malicious software.

A central management entity can perform remote attestation by inspecting the boot log and the PCR values to determine different components that were measured, their measured values, and make a decision about the trust level of each component accordingly. The measurements can be verified by the central management entity using a corresponding public key. For example, the central management entity may not be able to authenticate the measurements of the malicious software and therefore that device may not be trusted to load the OS or any user applications. Having a central management entity manage the attestation remotely may also be desirable for certain applications that can be managed remotely, e.g., cloud-based applications.

Embodiments can provide systems and methods to authenticate the devices using a modified measured boot approach before establishing a secure communication link between the devices. Each device may execute a respective measured boot process until the device reaches the stage responsible for establishing the communication link with the other device. Each device can own a cryptographic identity (e.g., a public/private key pair) that can be used by the device to attest its boot process. Each device may treat the identity of the other device as another boot stage that needs to be loaded and executed. For example, each device may receive the identity of the other device (e.g., a public key or a digital certificate), extend its own certificate chain with the identity of the other device, and have it measured as part of the boot process. Each device can then generate a new pair of keys based on its extended certificate chain that includes the identity of the other device, and exchange the public key of the new key pair with the other device. Thus, each device can use the public key associated with the other device as the identity of the other device to establish link keys for communication with the other device. A central management entity can attest the measurements of the boot stages for each device to authenticate the identity of the devices using the corresponding public keys. Thus, the measurements of the boot process can be performed in a protected manner within each device.

Each device can utilize a suitable cryptographic technique to generate a first asymmetric key pair using hardware and/or software components of the device, which can represent a hardware identity of that device. For example, device identifier composition engine (DICE), trusted platform module (TPM), or another suitable technique may be used to generate a first asymmetric key pair as part of an initial boot stage in a boot process for each device. The first asymmetric key pair may include a first public key and a first private key, and can be used to generate a first digital certificate representing an identity of the device. The first digital certificate may include the first public key that is signed by the first private key, and may represent a root of a certificate chain for the given device. The first public key for each device can be used by the central management entity for remote attestation of the boot process for the device. Each device can exchange their self-signed first digital certificates that include their corresponding first public keys.

Each device can use the self-signed first digital certificate received from the other device to generate a second digital certificate as part of a next stage in the boot process for that device. For example, each device may generate a second asymmetric key pair based on the first public key of the other device (from the first digital certificate received from the other device) using an irreversible (or secure) cryptographic process. The second digital certificate may include a second public key that is signed by the first private key, and can be extended to the certificate chain for the given device. Thus, the certificate chain for each device may include the measurements or the first public key of the other device that is tied to the identity of that device. In some embodiments, the measurements from each boot stage can also be stored in one or more measurement registers (similar to the PCRs), which can be used by the central management entity for attestation using the public keys associated with each device. For example, the central management entity may perform remote attestation of the boot process for each device using the corresponding public key to authenticate that device. The first and second digital certificates may be based on a standard such as X.509.

Each device can delete its own first private key after generating the second key pair and before establishing the secure link, which can be beneficial if the other device is compromised. Each device can exchange their self-signed second digital certificates that include their second public keys. Each device can verify the signature of the second digital certificate based on the self-signed first digital certificate received from the other device. For example, each device can determine whether the second public key of the other device is signed correctly by the first public key of the other device since the second pubic key is generated from the first public key. The identity of each device can be used to generate keys for a secure communication link between the devices using a key exchange protocol such as Diffie-Hellman, or Rivest-Shamir-Adleman (RSA), etc.

In some instances, one of the devices may be an unauthorized component and may have a fake identity. In such cases, the device with the fake identity may not have the corresponding private key to sign its second public key, and therefore the identity of the other device cannot be verified correctly based on the self-signed certificates. In another instance, if one of the devices or the software loaded on a device is malicious, the corresponding public key or the measurements may be inaccurate, and therefore its boot process as well as the remote attestation may be broken due to inaccuracies in the certificate chain. Since the measurement registers may have been extended with wrong values, access to the local resources can be blocked. In some instances, if an adversary device is able to replay its first boot stage, the legitimate device can complete its own measured boot process successfully using the correct first self-signed certificate; however, the legitimate device may not be able to verify the self-signed second digital certificate of the other device. In case the adversary device is able to also replay the self-signed second digital certificate, the legitimate device can use the second public key of the adversary device; however, the adversary device may not have the corresponding second private key, and therefore the connection attempt may fail. Thus, in various embodiments, certain security threats can be mitigated when establishing a secure communication link between the devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
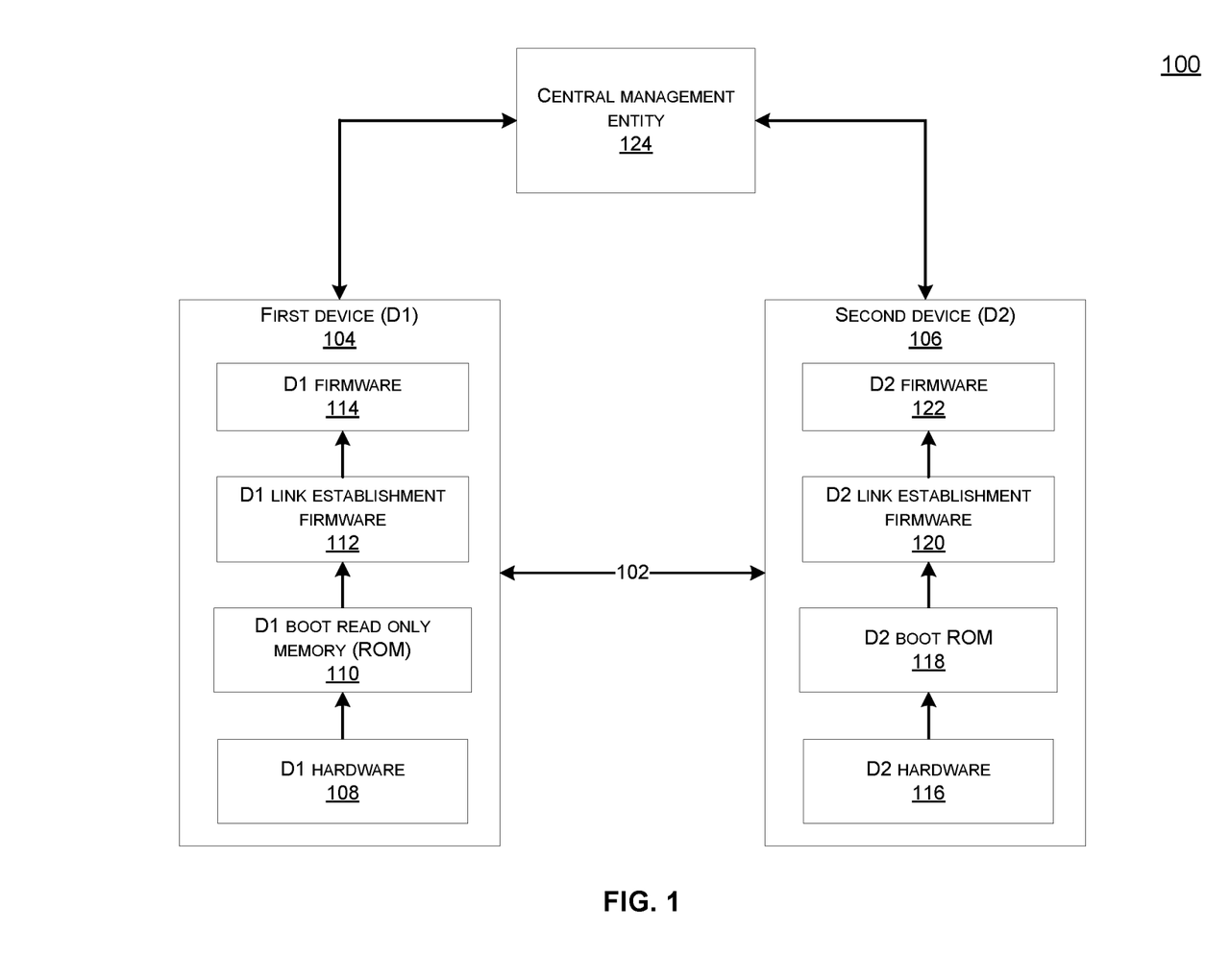
FIG. 1 illustrates an example of a system that can be used to establish a secure communication link between two devices, according to certain embodiments.

FIG. 1 illustrates an example of a system 100 that can be used to establish a secure communication link between two devices, according to certain embodiments.

System 100 may include a first device (D1) 104 and a second device (D2) 106 connected via a communication link 102. Each of D1 104 and D2 106 may include a system-on-a-chip (SoC), a field programmable gate array (FPGA), a central processing unit (CPU), an application specific integrated circuit (ASIC), or other suitable integrated circuit (IC). In some examples, D1 104 and D2 106 can be configured to operate as a single device to support complex applications that may demand high performance such as artificial intelligence (AI), networking, cloud computing, high-performance computing (HPC), Internet of Things (IoT), or web hosting, among others. In some examples, each of D1 104 and D2 106 can be configured to operate as a stand-alone device based on the application. The communication link 102 may include an interconnect, a communication fabric, a bus, wires, a hub, or another suitable link based on the type of the devices. For example, two SoCs may be connected via a PCIe bus, and two CPUs/GPUs may be connected via a fabric over a compute express link (CXL). It may be desirable to encrypt and authenticate the communication link 102 to enable secure communication between D1 104 and D2 106, when D1 104 and D2 106 are operated as a single device.

Each of D1 104 and D2 106 may support a measured boot process and go through a respective boot sequence before D1 104 and D2 106 can communicate securely over the communication link 102. Generally, in the measured boot process, each boot stage in a respective boot process for each device can measure the next boot stage before handing the control over to the next boot stage. In certain embodiments, each device can treat the identity of the other device as another boot stage in the boot process. Each boot stage can sign the measurements of the next boot stage, and add the measurements for the next boot stage into its certificate chain. Each boot stage may also generate a new asymmetric key pair for the next boot stage. The measurements for each boot stage can be recorded into a boot log as boot measurement data. The boot measurement data may include hash (e.g., SHA-256) of the relevant data associated with each boot stage, the device, various configurations, or any other information that can be used for remote attestation. The measured boot process can also measure different boot stages into one or more measurement registers (e.g., platform configuration registers). For example, the one or more measurement registers can be extended with the measurements for each boot stage as the device goes through the boot sequence. Extending may imply hashing a new value with the current value of a given measurement register.

A central management entity 124 may perform the remote attestation to verify the identity and integrity of the boot process for D1 104 and D2 106 by comparing the boot log with the corresponding values in the measurement registers. Note that both D1 104 and D2 106 can support a different boot sequence and go through different boot stages before reaching a respective boot stage responsible for establishing the secure communication link 102; however for ease of discussion, the same boot sequence is shown for D1 104 and D2 106 in FIG. 1.

In some examples, a D1 boot read only memory (ROM) 110 may store the first code to be executed after power-on or reset of D1 104 as part of an initial (e.g., a first) boot stage. The code in the D1 boot ROM 110 may be write-protected and represent a hardware root-of-trust, which may be tied to an identity of D1 104. For example, the code in the D1 boot ROM 110 may be loaded during manufacturing of D1 104, and therefore can be implicitly trusted. In various embodiments, D1 hardware 108 and/or the D1 boot ROM 110 may be used to generate a secret key pair based on the DICE, TPM, or another cryptographic technique. For example, the D1 hardware 108 may provide a hardware specific cryptographic seed (e.g., configuration of pins, or internal fuses), which can be used by the D1 boot ROM 110 to generate a first D1 key pair. The first D1 key pair may include a first set of asymmetric keys comprising a first D1 public key and a first D1 private key. The first D1 public key may represent an identity of D1 104 and can be used by the central management entity 124 for attestation. The first D1 private key stays within D1 104 and can be used to sign the first D1 public key to generate a first self-signed D1 digital certificate, which can be the root of a D1 certificate chain for D1 104. In some embodiments, the D1 boot ROM 110 may also store the code to configure D1 104 to operate in conjunction with D2 106 as a single device (e.g., a multi-SoC device), and to initiate a link establishment process for secure communication with D2 106.

In some embodiments, D2 106 may include similar functionality as D1 104 and perform the same boot sequence as D1 104. For example, a D2 boot ROM 118 may store the first code to be executed after power-on or reset of D2 106 as part of an initial (e.g., a first) boot stage. The code in the D2 boot ROM 118 may be write-protected and represent a hardware root-of-trust, which may be tied to an identity of D2 106. For example, the code in the D2 boot ROM 118 may be loaded during manufacturing of D2 106, and therefore can be implicitly trusted. D2 106 may generate a first D2 key pair based on D2 hardware 116 and/or the D2 boot ROM 118. In various embodiments, the D2 hardware 116 and/or the D2 boot ROM 118 may be used to generate a secret key pair based on the DICE, TPM, or another cryptographic technique. For example, the D2 hardware 116 may provide a hardware specific cryptographic seed (e.g., configuration of pins, or internal fuses), which can be used by the D2 boot ROM 118 to generate the first D2 key pair. The first D2 key pair may include a first set of asymmetric keys comprising a first D2 public key and a first D2 private key. The first D2 public key may represent an identity of D2 106 and can be used by the central management entity 124 for attestation. The first D2 private key stays within D2 106 and can be used to sign the first D2 public key to generate a first self-signed D2 digital certificate, which can be the root of a D2 certificate chain for D2 106. In some embodiments, the D2 boot ROM 118 may also store the code to configure D2 106 to operate in conjunction with D1 104 as a single device (e.g., a multi-SoC device), and to initiate a link establishment process for secure communication with D1 104.

Each of D1 104 and D2 106 may go through a respective boot sequence before reaching a stage (e.g., a certain point of a boot stage) responsible for establishing the communication link 102. In certain embodiments, the stage for D1 104 that is responsible for establishing the secure communication link with D2 106 may be part of a D1 link establishment firmware 112. Similarly, the stage for D2 106 that is responsible for establishing the secure communication link with D1 104 may be part of a D2 link establishment firmware 120. Note that, in some cases, one or more additional stages or boot stages may be executed by each of D1 104 and D2 106 before executing the D1 link establishment firmware 112 and the D2 link establishment firmware 120, respectively, which are not shown in FIG. 1 for simplicity reasons. For example, in some embodiments, the code to configure D1 104 and D2 106 to be used as a single device, and to initiate the link establishment process can be part of a separate configuration boot stage. For example, the code for this configuration boot stage may be stored in a separate memory, e.g., a firmware flash memory, which can be loaded and measured by the respective boot ROM. In some examples, additional boot stages may be executed for a boot loader, an operating system (OS), or an OS kernel, before executing the link establishment boot stage.

In certain embodiments, the D1 boot ROM 110 may sign the measurements of the D1 link establishment firmware 112 and add the measurements for the D1 link establishment firmware 112 into the D1 certificate chain. The D1 certificate chain may already include the measurements for all the boot stages for D1 104 prior to the boot stage for the D1 link establishment firmware 112. Similarly, the D2 boot ROM 118 may sign the measurements of the D2 link establishment firmware 120 and add the measurements for the D2 link establishment firmware 120 into the D2 certificate chain. The D2 certificate chain may already include the measurements for all the boot stages for D2 106 prior to the boot stage for the D2 link establishment firmware 120.

In certain embodiments, D1 104 may treat the identity of D2 106 as another (e.g., second) boot stage that needs to be loaded before establishing the secure communication link with D2 106, and D2 106 may treat the identity of D1 104 as another (e.g., second) boot stage that needs to be loaded before establishing the secure communication link with D1 104. Thus, D1 104 and D2 106 may exchange their self-signed certificates to receive the corresponding identities. For example, the D1 link establishment firmware 112 may send the first D1 digital certificate to D2 106, and the D2 link establishment firmware 120 may send the first D2 digital certificate to D1 104. D1 104 may sign the first D2 digital certificate received from D2 106 using the first D1 private key and extend it to the D1 certificate chain. The relevant measurement registers in D1 104 may also be extended with the measurements received from D2 106. D1 104 may delete the first D1 private key to avoid access to the first D1 private key at a later stage in case D1 104 is comprised. Similarly, D2 106 may sign the first D1 digital certificate received from D1 104 using the first D2 private key and extend it to D2 certificate chain. The relevant measurement registers in D2 106 may also be extended with the measurements received from D1 104. D2 106 may delete the first D2 private key to avoid access to the first D2 private key at a later stage in case D2 106 is compromised.

The D1 link establishment firmware 112 may generate a second D1 digital certificate as part of the second boot stage in the boot process for D1 104 based on the first D2 digital certificate received from D2 106 that has been signed with the first D1 private key. The second D1 digital certificate may comprise a second D1 public key signed by the first D1 private key. The D2 link establishment firmware 120 may generate a second D2 digital certificate as part of the second boot stage in the boot process for D2 106 based on the first D1 digital certificate received from D1 104 that has been signed with the first D2 private key. The second D2 digital certificate may comprise a second D2 public key signed by the first D2 private key. Thus, the second D1 digital certificate may include the measurements of the first boot stage of D2 106 and can be an extension to the first D1 digital certificate in the D1 certificate chain. Similarly, the second D2 digital certificate may include the measurements of the first boot stage of D1 104 and can be an extension to the first D2 digital certificate in the D2 certificate chain. D1 104 may send the second D1 digital certificate to D2 106, and D2 106 may send the second D2 digital certificate to D1 104. Additionally, the relevant measurement registers in D1 104 and D2 106 may also be extended accordingly.

The D1 link establishment firmware 112 may verify signature of the second D2 digital certificate using the first D2 digital certificate received from D2 106. Similarly, the D2 link establishment firmware 120 may verify the signature of the second D1 digital certificate using the first D1 digital certificate received from D1 104. Once D1 104 and D2 106 have each other's identities, a key exchange protocol (e.g., Diffie-Hellman, RSA) can be executed to establish the secure link between D1 104 and D2 106 to communicate securely over the communication link 102. Once the secure communication link is established, each device can load the next software image as needed. For example, D1 104 can load D1 firmware 114 and D2 106 can load D2 firmware 122. Each of the D1 firmware 114 and the D2 firmware 122 may include code for one or more user applications, or other code based on the respective functionality.

The central management entity 124 may include hardware and software components to perform the attestation remotely. For example, the central management entity 124 may include a server computer or a computing device with a network interface for remote access. The central management entity 124 may have access to the public keys representing the identities of D1 104 and D2 106, and can use these public keys to access the measurements associated with the boot process and perform remote attestation of the boot process for each device. The second private keys stay within the respective devices and are not needed for the remote attestation. Thus, the various embodiments can be used to establish a secure communication link between the devices that can support internal measured boot process, which can allow extending their respective certificate chains with the measurements from the other device. In an instance where a malicious software is executing on one of the devices, its measurements may be extended to the certificate chain of the other device, which may fail the attestation process eventually, thus making the device untrustworthy.

Figure 2:
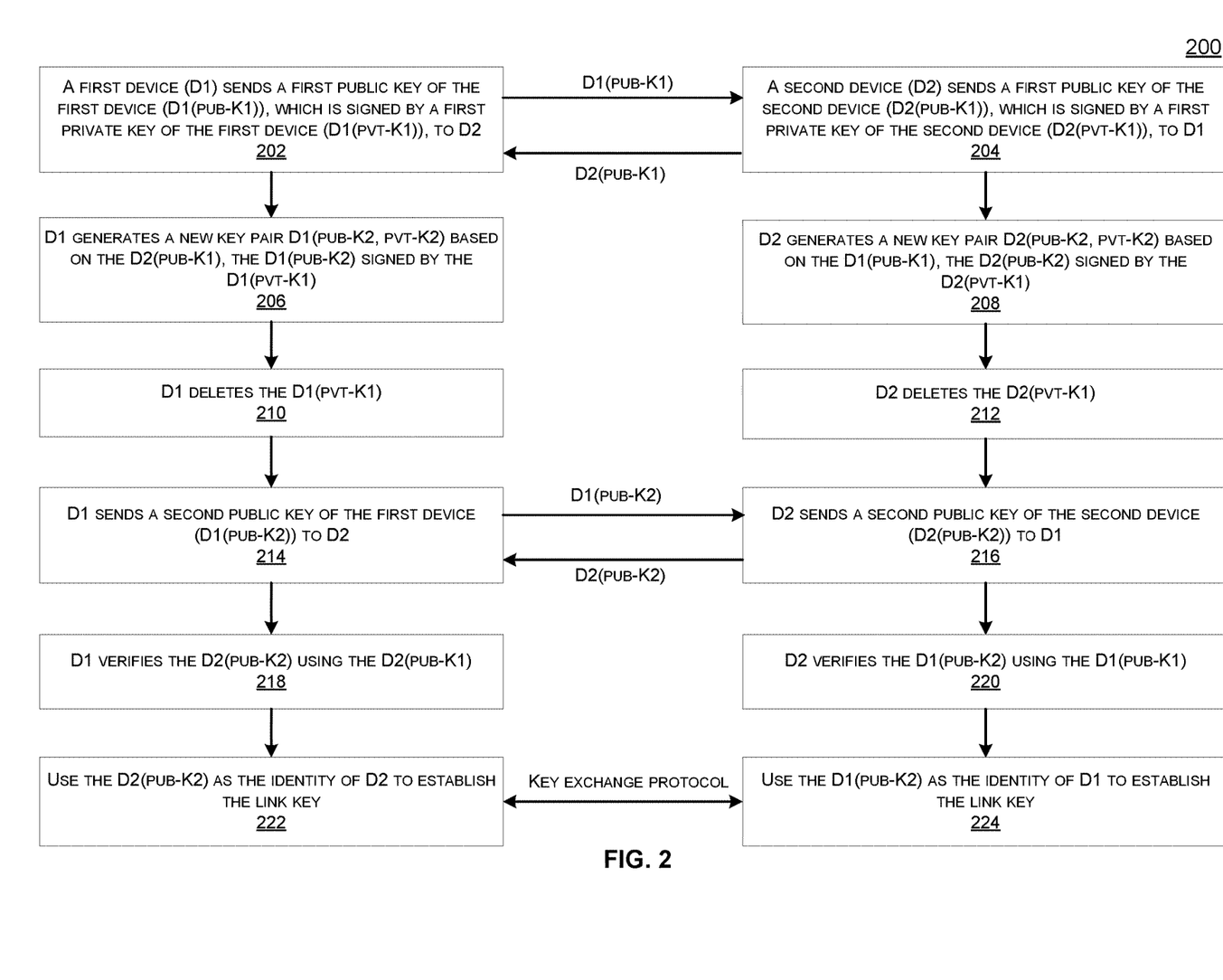
FIG. 2 illustrates a flow chart of an example of a process to establish a secure link between two devices, according to certain embodiments.
Figure 3:
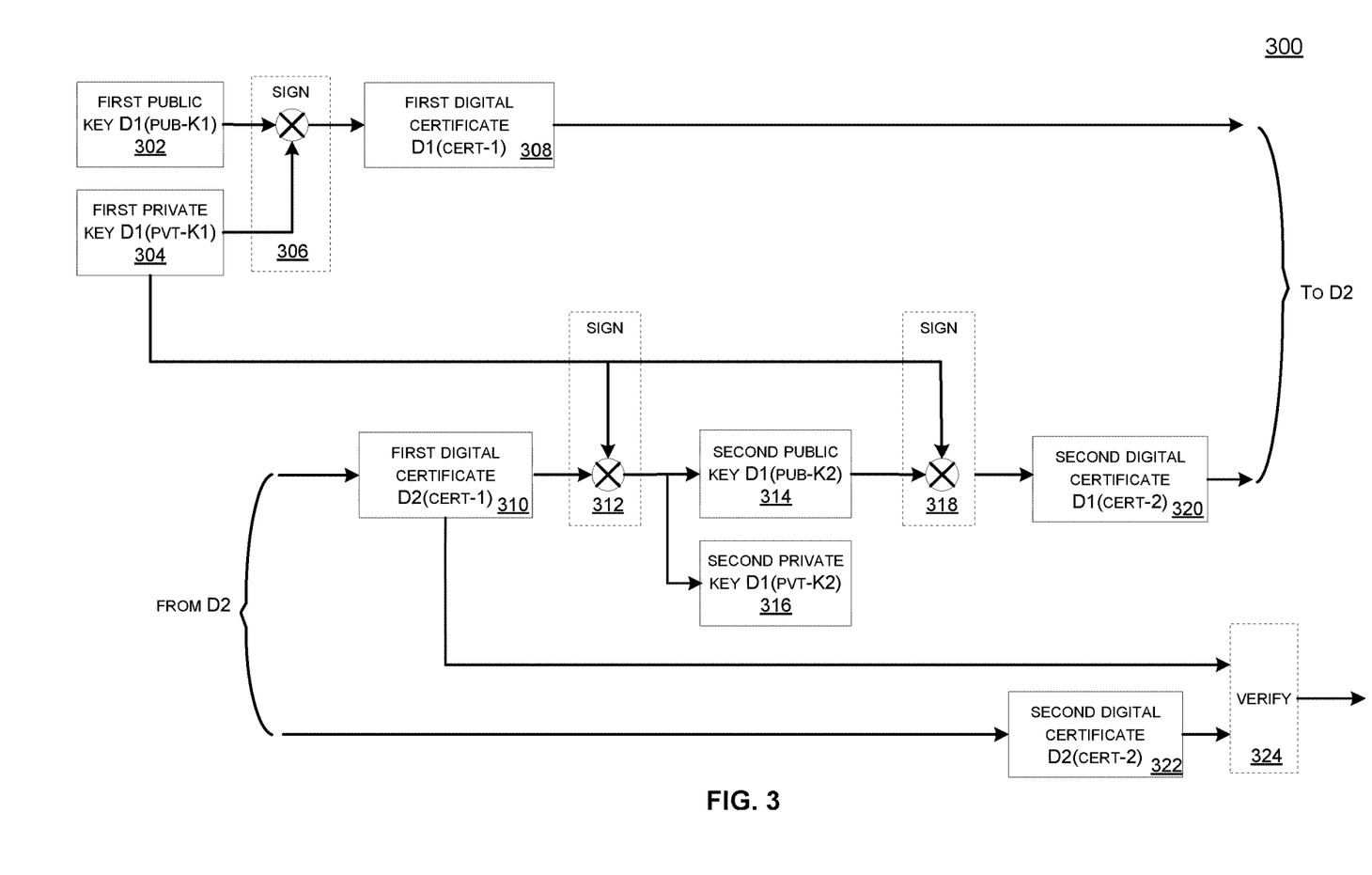
FIG. 3 illustrates an example of generation of self-signed digital certificates by a device using the identity of the other device, according to certain embodiments.

FIG. 2 illustrates a flow chart 200 of an example of a process to establish a secure link between two devices, according to certain embodiments. FIG. 3 illustrates an example of generation of self-signed digital certificates by a device using the identity of the other device, according to certain embodiments. As an example, the method may be executed by the D1 link establishment firmware 112 as part of a boot process for D1 104, and by the D2 link establishment firmware 120 as part of a boot process for D2 106. In some examples, D1 104 can be a first SoC, and D2 106 can be a second SoC.

In step 202, a first device (D1) may send a first public key of the first device (D1(pub-K1)) to a second device (D2). D1(pub-K1) may be signed by a corresponding first private key of the first device (D1(pvt-K1)). As shown in FIG. 3, a first public key D1(pub-K1) 302 for D1 104 can be signed by a first private key D1(pvt-K1) 304. A signing operation 306 may include encryption and/or hashing, and can be used to generate a first digital certificate (D1(cert-1)) 308 for D1 104 comprising the first signed public key for D1 104. Thus, D1(cert-1) 308 may include the measurements from all the boot stages up to this boot stage for D1 104. D1 104 may send D1(pub-K1) as part of D1(cert-1) 308 to D2 106. D1(pub-K1) and D1(pvt-K1) may correspond to the first D1 key pair generated by D1 104 using the D1 hardware 108 and/or the D1 boot ROM 110 as part of a first stage in the boot process for D1 104, and can be associated with a hardware identity of D1 104, as discussed with reference to FIG. 1. The first stage can be any stage in the boot process for D1 104. D1(pub-K1) may be verifiable by the central management entity 124 for a remote attestation of the boot process for D1 104. D2 106 may receive D1(cert-1) 308 and extend the D2 certificate chain with D1(cert-1) 308. Thus, the D2 certificate chain may now include the measurements from all its boot stages up to this stage as well as the measurements from the boot stages for D1 104. The one or more measurement registers in D2 106 may also be extended with the measurements received from D1 104. The measurements can also be recorded into a boot log in D1 104.

In step 204, D2 106 may send a first public key of the second device (D2(pub-K1)) to D1 104. D2(pub-K1) may be signed by a corresponding first private key of the second device (D2(pvt-K1)). D2(pub-K1) and D2(pvt-K1) may correspond to the first D2 key pair generated by D2 106 using the D2 hardware 116 and/or the D2 boot ROM 118 as part of a first stage in the boot process for D2 106, and can be associated with a hardware identity of D2 106, as discussed with reference to FIG. 1. The first stage can be any stage in the boot process for D2 106. D2(pub-K1) may be verifiable by the central management entity 124 for a remote attestation of the boot process for D2 106. As shown in FIG. 3, D2 106 may send a first digital certificate (D2(cert-1)) 310 comprising the first signed public key for D2 106 to D1 104. The first digital certificate D2(cert-1) 310 can be generated in the same manner as D1(cert-1) 308. D2(cert-1) 310 may include the measurements from all the boot stages up to this stage for D2 106. D1 104 may receive D2(cert-1) 310 and extend D1 certificate chain with D2(cert-1) 310. Thus, the D1 certificate chain may now include the measurements from all its boot stages up to this stage as well as the measurements from the boot stages for D2 106. The one or more measurement registers in D1 104 may also be extended with the measurements received from D2 106. The measurements can also be recorded into a boot log in D2 106.

In step 206, D1 104 may generate a new key pair D1 (pub-K2, pvt-K2) based on D2(pub-K1) using an irreversible cryptographic process. D1(pub-K2) may be signed using D1(ptv-K1). The irreversible cryptographic process may represent a secure cryptographic process such that D1(pvt-K2) cannot be used to determine D1(pvt-K1). As shown in FIG. 3, D1 104 may sign D2(cert-1) 310 with D1(pvt-K1) 304 using a signing operation 312 and generate a second key pair comprising a second public key (D1(pub-K2)) 314 and a second private key (D1(pvt-K2)) 316. Thus, the identity of D2 106 may be baked into the identity of D1 104.

In step 208, D2 106 may generate a new key pair D2 (pub-K2, pvt-K2) based on D1(pub-K1) using an irreversible cryptographic process. D2(pub-K2) may be signed using D2(pvt-K1). The irreversible cryptographic process may represent a secure cryptographic process such that D2(pvt-K2) cannot be used to determine D2(pvt-K1). For example, D2 106 may sign D1(cert-1) 308 with D2(pvt-K1) and generate a second key pair comprising a second public key (D2(pub-K2)) and a second private key (D2(pvt-K2)). Thus, the identity of D1 104 may be baked into the identity of D2 106.

In step 210, D1 104 may delete D1(pvt-K1). As shown in FIG. 3, since D1(pvt-K1) 304 has already been used to generate the new key pair D1 (pub-K2, pvt-K2), deleting D1(pvt-K1) 304 prior to establishing the secure link may ensure that D1(pvt-K1) 304 cannot not misused if D1 104 is compromised.

In step 212, D2 106 may delete D2(pvt-K1). Since D2(pvt-K1) has already been used to generate the new key pair D2 (pub-K2, pvt-K2), deleting D2(pvt-K1) prior to establishing the secure link may ensure that D2(pvt-K1) cannot not misused if D2 106 is compromised.

In step 214, D1 104 may send D1(pub-K2) to D2 106. As shown in FIG. 3, D1 104 may sign D1(pub-K2) 314 with D1(pvt-K1) 304 using a signing operation 318, and generate a second digital certificate D1(cert-2) 320. D1 104 may send D1(pub-K2) 314 as part of D1(cert-2) 320 to D2 106. D1(cert-2) 320 may include the boot measurement data of the first stage in the boot process for D2 106, and can be an extension to D1(cert-1) 308 in the certificate chain of D1 104. D2 106 may receive D1(cert-2) 320 and extend the D2 certificate chain with D1(cert-2) 320. The one or more measurement registers in D2 106 may also be extended with the measurements received from D1 104. The measurements can also be recorded into a boot log in D1 104.

In step 216, D2 106 may send D2(pub-K2) to D1 104. As shown in FIG. 3, D2 106 may send a second digital certificate (D2(cert-2)) 322 comprising the second signed public key for D2 106 to D1 104. The second digital certificate D2(cert-2) 322 can be generated in the same manner as D1(cert-2) 320. D2(cert-2) 322 may include the boot measurement data of the first stage in the boot process for D1 104, and can be an extension to D2(cert-1) 310 in the certificate chain of D2 106. D1 104 may receive D2(cert-2) 322 and extend the D1 certificate chain with D2(cert-2) 322. The one or more measurement registers in D1 104 may also be extended with the measurements received from D2 106. The measurements can also be recorded into a boot log in D2 106.

In step 218, D1 104 may verify D2(pub-K2) using D2(pub-K1). As shown in FIG. 3, D1 104 may verify D2(cert-2) 322 using D2(cert-1) 310 based on a verify operation 324. Since D2(pub-K2) is generated based on D2(pub-K1) and D1(pub-K1), verifying operation may include validating the signature of D2(cert-2) 322 to ensure that D2(pub-K2) is aligned to D2(pub-K1).

In step 220, D2 106 may verify D1(pub-K2) using D1(pub-K1). D2 106 may verify D1(cert-2) 320 using D1(cert-1) 308 based on a verify operation similar to the verify operation 324. Since D1(pub-K2) is generated based on D1(pub-K1) and D2(pub-K1), verifying operation may include validating the signature of D1(cert-2) 320 to ensure that D1(pub-K2) is aligned to D1(pub-K1).

In step 222, D1 104 may use D2(pub-K2) as the identity of D2 106 to establish the link key. Since D2(pub-K2) is tied to D1(pub-K1) and D2(pub-K1), the identity of D2 106 can be trusted if the signature of D2(cert-2) 322 has been verified.

In step 224, D2 106 may use D1(pub-K2) as the identity of D1 104 to establish the link key. Since D1(pub-K2) is tied to D2(pub-K1) and D1(pub-K1), the identity of D1 104 can be trusted if the signature of D1(cert-2) 320 has been verified.

The communication link 102 between D1 104 and D2 106 can be established using the identity of D1 104 and D2 106 based on any key exchange protocol such as the Diffie-Hellman or the RSA. Once the communication link 102 is established, each device can load the next software image. For example, D1 104 can load D1 firmware 114 and D2 106 can load D2 firmware 122. Each of the D1 firmware 114 and the D2 firmware 122 may include code for one or more user applications, or other code based on the respective functionality.

The central management entity 124 may perform the remote attestation of the boot process for D1 104 using D1(pub-K1) and for D2 106 using D2(pub-K1). The central management entity 124 may use D1(pub-K2) and D2(pub-K2) to access the measurements associated with the boot process from D1 104 and D2 106 to determine the authenticity and integrity of the system. As an example, the central management entity 124 may compare the boot log for each of D1 104 and D2 106 with the corresponding values in the respective measurement registers. Based on the comparison, the central management entity 124 may determine whether D1 104 or D2 106 can be trusted.

Certain embodiments can be used to mitigate threats posed by an adversary device or firmware connected to a legitimate device. For example, if the link establishment firmware or any of the device has been compromised, the remote attestation performed by the central management entity 124 may fail because the certificate chain may be extended with inaccurate values. Since the measurements extended to the measurement registers may have wrong values, the remote attestation may fail and therefore access to the local assets on the compromised device can be denied to the adversary.

In some examples, the compromised device may be able to replay the first public key or the measurements. In such cases, the legitimate device may be able to complete its own measured boot process (e.g., the first and second boot stages) since it received correct values from the compromised device. However, the legitimate device may be able to determine that the self-signed certificate of the compromised device is inaccurate. In case the self-signed certificate is also replayed by the compromised device, the legitimate device may use the public key of the compromised device; however, the compromised device doesn't have the private key corresponding to that public key, and therefore the connection attempt may fail.

In some examples, an adversary can gain physical access to a device and execute its own firmware as part of the measured boot process. This may also be possible using the verified boot approach where the adversary can gain access to the device hardware by executing its own malware. However, this issue can be resolved once the identity of the legitimate device (e.g., public key) is also sent in a verified way to the compromised device.

Figure 4:
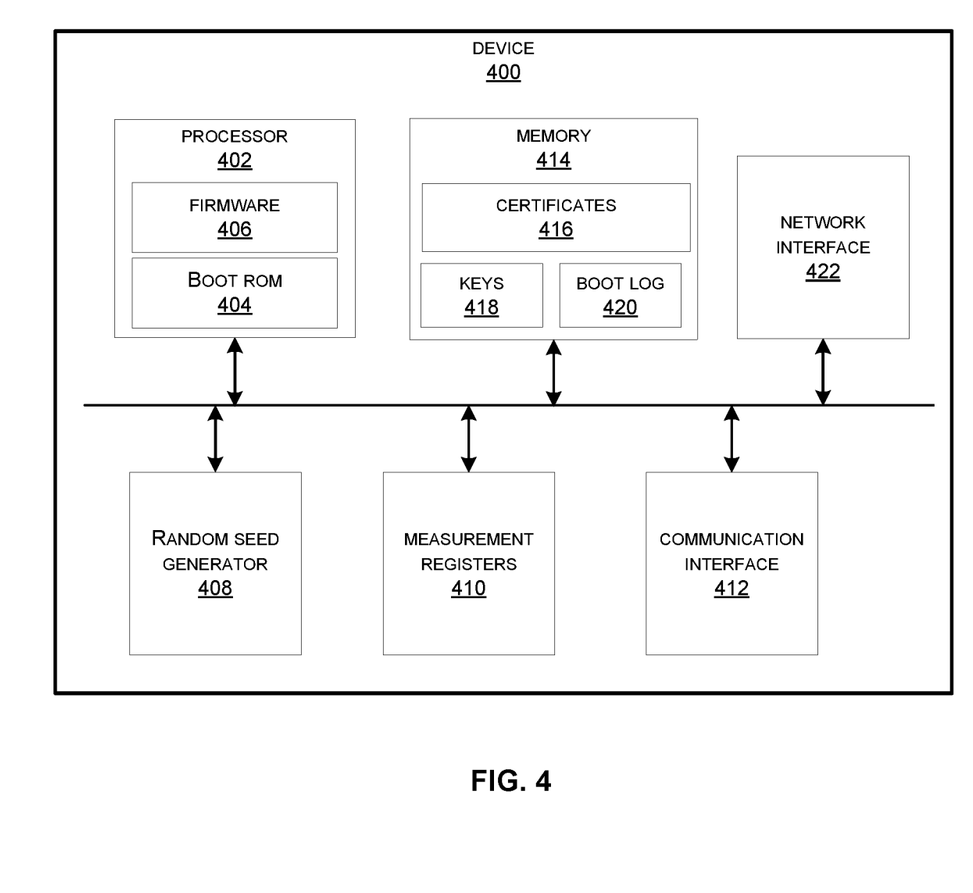
FIG. 4 illustrates an example device that can be used in certain embodiments.

FIG. 4 illustrates an example device 400 that can be used in certain embodiments. The device 400 can be an example of D1 104 and/or D2 106. The device 400 may include a processor 402, a random seed generator 408, measurement registers 410, a communication interface 412, a memory 414, and a network interface 422.

The processor 402 may be configured to execute instructions that may be stored in a non-transitory computer-readable medium. For example, the processor 402 may execute boot ROM 404 and firmware 406. In certain embodiments, the boot ROM 404 may store immutable code that may be executed by the processor 402 on power-on or reset. For example, the boot ROM 404 may store code for an initial boot stage for the device 400 as discussed with reference to the D1 boot ROM 110 and the D2 boot ROM 118. Executing the code stored in the boot ROM 404 may generate a first key pair based on a cryptographic seed provided by the device hardware and may represent a hardware identity of the device.

The firmware 406 may include configuration firmware for configuring the device 400 for connecting with another device, and initiating the link establishment process. The firmware 406 may also include link establishment firmware for establishing the communication link with the other device using the measured boot approach, as discussed with reference to the D1 link establishment firmware 112 and the D2 link establishment firmware 120. In some examples, the firmware 406 may also include firmware that is specific to the device functionality, similar to the D1 firmware 114 or the D2 firmware 122. The firmware 406 may be stored in a ROM, flash memory, EEPROM, or other suitable memory. In some embodiments, each of the configuration firmware, the link establishment firmware, and the device functionality firmware may be stored in a separate memory device, e.g., a flash memory, a ROM, or an EEPROM.

The memory 414 may be used to store keys 418, certificates 416, and a boot log 420 associated with the link establishment process. For example, the memory 414 may be used to store the first pair of asymmetrical keys D1(pub-K1, pvt-K1) or D2(pub-K1, pvt-K1), and the second pair of asymmetrical keys D1(pub-K2, pvt-K2) or D2(pub-K2, pvt-K2). The memory 414 may also be used to store first digital certificates D1(cert-1) or D1(cert-1), and the second digital certificates D1(cert-2) or D1(cert-2). The boot log 420 may include boot measurement data from each boot stage of the device 400, which can be used for remote attestation. Note that the memory 414 may be used to store other data related to the functionality of the device 400, which is not shown here for ease of discussion. The memory 414 may be implemented using DRAM, SRAM, SDRAM, or other suitable type of memory. In certain embodiments, a portion of the memory 414 that is used to store the keys 418 and the certificates 416 may be protected or secured, and may have privileged access. In some examples, the keys 418, certificates 418, and the boot log 420 may only be accessed with the public key (e.g., D1(pub-K2) or D2(pub-K2) associated with the device 400 that has been verified.

The random seed generator 408 may be configured to provide a random seed, which may be unique to the device 400, as discussed with reference to the D1 hardware 108 or the D2 hardware 116. In some examples, the random seed generator 408 may generate a random number based on pin configurations, fuses, or other hardware mechanism, which can be used to generate a unique secret that may be tied to an identity of the device 400. The unique secret may be used by the boot ROM 404 to generate the first pair of keys that can be exchanged with the other device as discussed with reference to the steps 202 and the 204 in FIG. 2. For example, the first pair of keys may include D1(pub-K1) and D1(pvt-K1) for D1 104, or D2(pub-K1) and D2(pvt-K1) for D2 106.

The measurement registers 410 may include registers for storing the measurements of the various boot stages in the boot process for the device 400. In some implementations, the measurements for each boot stage may be stored in a separate register. In other implementations, the same measurement register may be extended with the measurements from each boot stage in the boot sequence. The measurements can be used by the central management entity 124 for the remote attestation.

The communication interface 412 may be used for communication with another device over the communication link. For example, the communication interface 412 on D1 104 may be configured to communicate with the communication interface 412 on D2 106 over the communication link 102. Each device may use the communication interface 412 to exchange the digital certificates or signed public keys with the other device as part of the link establishment process. Once the secure link is established, D1 104 and D2 106 can use the communication link 102 to exchange data and commands based on the application.

The network interface 422 may be configured to communicate with a remote device using a suitable network interface. For example, the device 400 may use the network interface 422 to communicate with the central management entity 124 for attestation. In some examples, the central management entity 124 may have access to the certificates 416, the keys 418, and the boot log 420 using the public key (e.g., D1(pub-K2), D2(pub-K2)) that has been verified.

Figure 5:
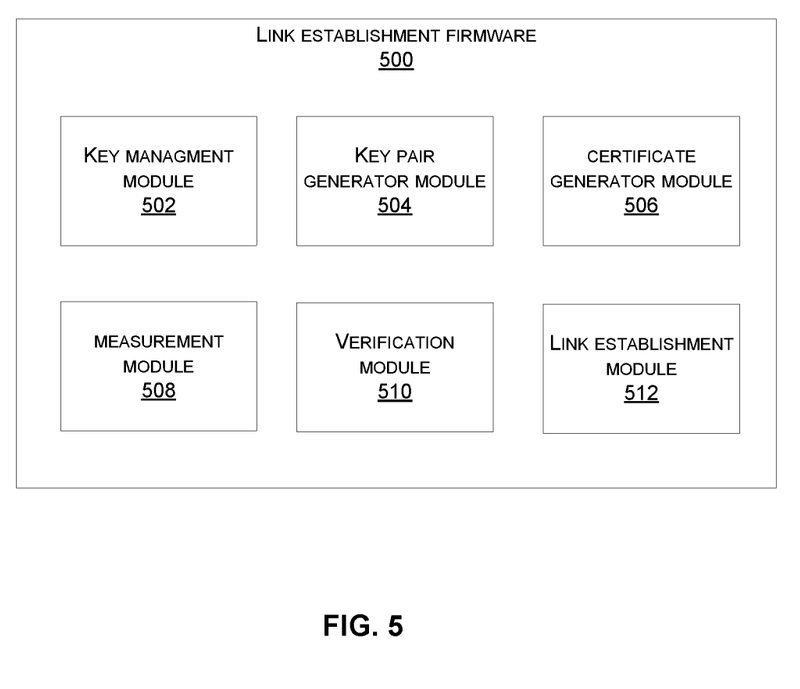
FIG. 5 illustrates a block diagram of an example of link establishment firmware that can be executed to perform the link establishment process, according to certain embodiments.

FIG. 5 illustrates a block diagram 500 of an example of link establishment firmware that can be executed to perform the link establishment process, according to certain embodiments. The link establishment firmware 500 may be part of the firmware 406 in FIG. 4 and can be executed to perform the link establishment process. For example, the link establishment firmware 500 may be an example of the D1 link establishment firmware 112 or the D2 link establishment firmware 120. The link establishment firmware 500 may include a key management module 502, a key pair generator module 504, a certificate generator module 506, a measurement module 508, a verification module 510, and a link establishment module 512.

The key management module 502 may be configured to manage the keys for the link establishment process. For example, the key management module 502 may retrieve the first key pair generated as part of an initial boot stage of the device 400. The key management module 502 may also be used to exchange the signed public keys with the other device, e.g., similar to D1(pub-K1) and D2(pub-K1), or D1(pub-K2) and D2(pub-K2). The key management module 502 may also be configured to delete the first private key e.g., D1(pvt-K1) or D2(pvt-K1), after the second key pair has been generated and before the secure link has been established.

The key pair generator module 504 may be configured to generate the second key pair. For example, the key pair generator module 504 may generate D1 (pub-K2, pvt-K2) based on D2(pub-K1) and D1(pvt-K1) for D1 104, or D2 (pub-K2, pvt-K2) based on D1(pub-K1) and D2(pvt-K1) for D2 106.

The certificate generator module 506 may be configured to generate the first self-signed digital certificate and the second self-signed digital certificate to be exchanged with the other device for the link establishment process. The certificate generator module 506 may generate a digital certificate using a public key and a private key, and may be based on the X.509 or other suitable standard. For example, the certificate generator module 506 may generate D1(cert-1) 308 and D1(cert-2) 320 for D1 104, and D2(cert-1) 310 and D2(cert-2) 322 for D2 106.

The measurement module 508 may be configured to measure various boot stages of the boot process for the device 400. As an example, the measurement module 508 may measure the first stage and the second stage of the boot process for the device 400. Measuring a stage may include computing a hash of the data associated with each stage including the public keys, digital certificates, measurement registers, among others. A suitable hash function based on secure hash algorithms (SHA) such as SHA-256, or SHA-512 can be used. The measurement module 508 may generate a digest or boot measurement data as a result of the measurements. The measurement module 508 may also be configured to store the measurements in the boot log 420 for each boot stage. The measurement module 508 may also be configured to provide the measurements to the central management entity 124 using the network interface 422 for remote attestation purposes.

The verification module 510 may be configured to verify the signature of the second digital certificate based on the signature of the first digital certificate for the device 400. For example, the verification module 510 may verify that the second public key (e.g., D1(pub-K2) or D2(pub-K2)) is aligned with the first public key (e.g., D1(pub-K1) or D2(pub-K1)) since the second public key is generated based on the first public key. In case one of the devices has been compromised, the signatures may not match, and therefore the secure link may not be established.

The link establishment module 512 may be configured to establish the secure link with the other device that has been authenticated. For example, the link establishment module 512 may use the second public key of the other device as a based key for a key exchange protocol, such as Diffie-Hellman or the RSA, to establish the secure link for communication with the other device.

Figure 6:
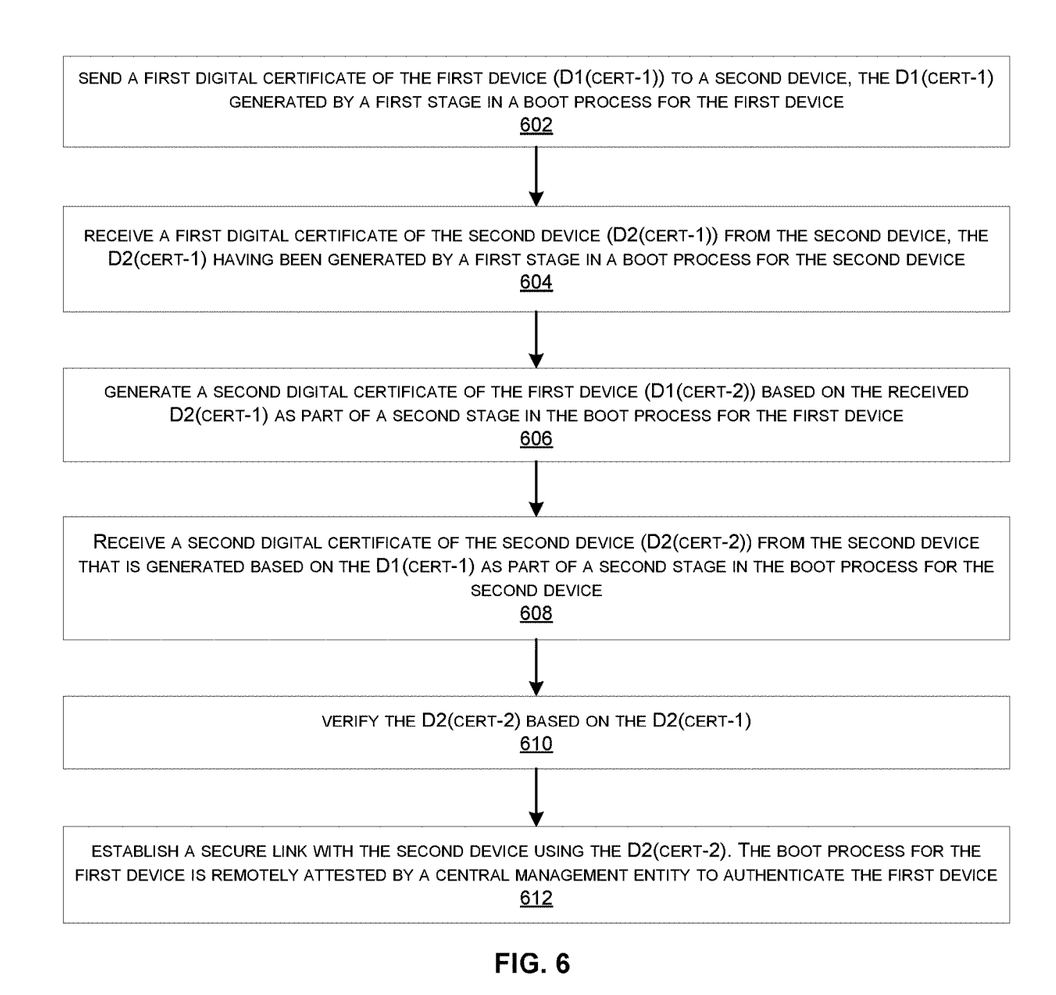
FIG. 6 illustrates a flow chart of an example of a process that can be performed by a first device to establish a link with a second device, according to certain embodiments.

FIG. 6 illustrates a flow chart 600 of an example of a process that can be performed by a first device to establish a link with a second device, according to certain embodiments. In some examples, the first device can be a first IC or a first SoC, and the second device can be a second IC or a second SoC. The method may be executed by one or more processors of the first device by executing instructions that may be stored in a non-transitory computer readable medium. As an example, the instructions may be part of the link establishment firmware 500. In certain examples, the method may be executed by D1 104 for establishing the secure link with D2 106.

In step 602, the method may include sending a first digital certificate of the first device (D1(cert-1)) to a second device. D1(cert-1) may be generated by a first stage in a boot process for the first device. As discussed with reference to FIGS. 2 and 3, D1 104 may be configured to send D1(cert-1) 308 to D2 106 using the communication interface 412. D1(cert-1) 308 may be generated by the certificate generator module 506 based on the D1 boot ROM 110 and the D1 hardware 108 as part of the first stage in the boot process for D1 104. D1(cert-1) 308 may include D1(pub-K1) that is signed by D1(pvt-K1). D1(cert-1) 308 may include the measurements of all the boot stages for D1 104 up to the stage responsible for establishing the link. For example, the measurements may be stored by the measurement module 508 in the measurement registers 410 and the boot log 420 in D1 104.

In step 604, the method may include receiving a first digital certificate of the second device (D2(cert-1)) from the second device. D2(cert-1) may have been generated by a first stage in a boot process for the second device. D1 104 may be configured to receive D2(cert-1) 310 from D2 106 using the communication interface 412, and store it in the certificates 416. D2(cert-1) 310 may have been generated by the certificate generator module 506 based on the D2 boot ROM 118 and the D2 hardware 116 as part of the first stage in the boot process for D2 106. D2(cert-1) 310 may include the measurements of all the boot stages for D2 106 up to the stage responsible for establishing the link. For example, the measurements may be stored by the measurement module 508 in the measurement registers 410 and the boot log 420 in D2 106.

In step 606, the method may include generating a second digital certificate of the first device (D1(cert-2)) based on the received D2(cert-1) as part of a second stage in the boot process for the first device. D1 104 may be configured to generate D1(cert-2) based on the received D2(cert-1) as part of a second stage in the boot process for D1 104. The certificate generator module 506 in D1 104 may generate D1(cert-2) 320 based on D2(cert-1) 310 as part of a second stage in the boot process for D1 104. For example, D1 104 may measure D2(cert-1) 310 received from D2 106 and generate a new pair of keys D1 (pub-K2, pvt-K2) since D1 104 may treat D2(cert-1) 310 as start of a new boot stage. The key pair generator 504 in D1 104 may generate the new pair of keys and the key management module 502 in D1 104 may delete D1(pvt-K1).

In step 608, the method may include receiving a second digital certificate of the second device (D2(cert-2)) from the second device that is generated based on D1(cert-1) as part of a second stage in the boot process for the second device. D1 104 may be configured to receive D2(cert-2) 322 from D2 106 using the communication interface 412. D2(cert-2) 322 may be generated based on D1(cert-1) 308 as part of a second stage in the boot process for D2 106. For example, D2 106 may measure D1(cert-1) 308 received from D1 104 and generate a new pair of keys D2 (pub-K2, pvt-K2) since D2 106 may treat D1(cert-1) 308 as start of a new boot stage.

In step 610, the method may include verifying D2(cert-2) based on D2(cert-1). D1 104 may be configured to verify D2(cert-2) 322 based on D2(cert-1) 310. Since D1(pub-K2) is generated based on D1(pub-K1) and D2(pub-K1), the verification module 510 in D1 104 may verify the signature of D1(cert-2) 320 to validate that D1(pub-K2) is aligned to D1(pub-K1). Similarly, D2 106 may verify D1(cert-2) 320 based on D1(cert-1) 308.

In step 612, the method may include establishing a secure link with the second device using D2(cert-2). D1 104 may be configured to establish a secure link with D2 106 using D2(cert-2). The link establishment module 512 in D1 104 may use D2(pub-K2) as a based key to generate link keys based on a key exchange protocol such as Diffie-Hellman or the RSA. D1 104 can communicate with D2 106 over the secure communication link 102 to exchange data and commands.

Note that the method described with reference to FIG. 6 can also be performed by D2 106 in parallel with D1 104 to establish the secure link. The central management entity 124 may use D1(pub-K2) and D2(pub-K2) to access the measurements associated with the boot process for D1 104 and D2 106, respectively, using the corresponding network interface 422, and perform remote attestation of the boot process to authenticate each device. Thus, certain embodiments can be used to provide a secure link for communication between the devices based on a modified measured boot approach. In some cases, a link can be established even if one of the devices is adversary; however, the identity of the adversary device cannot be authenticated during attestation.

Figure 7:
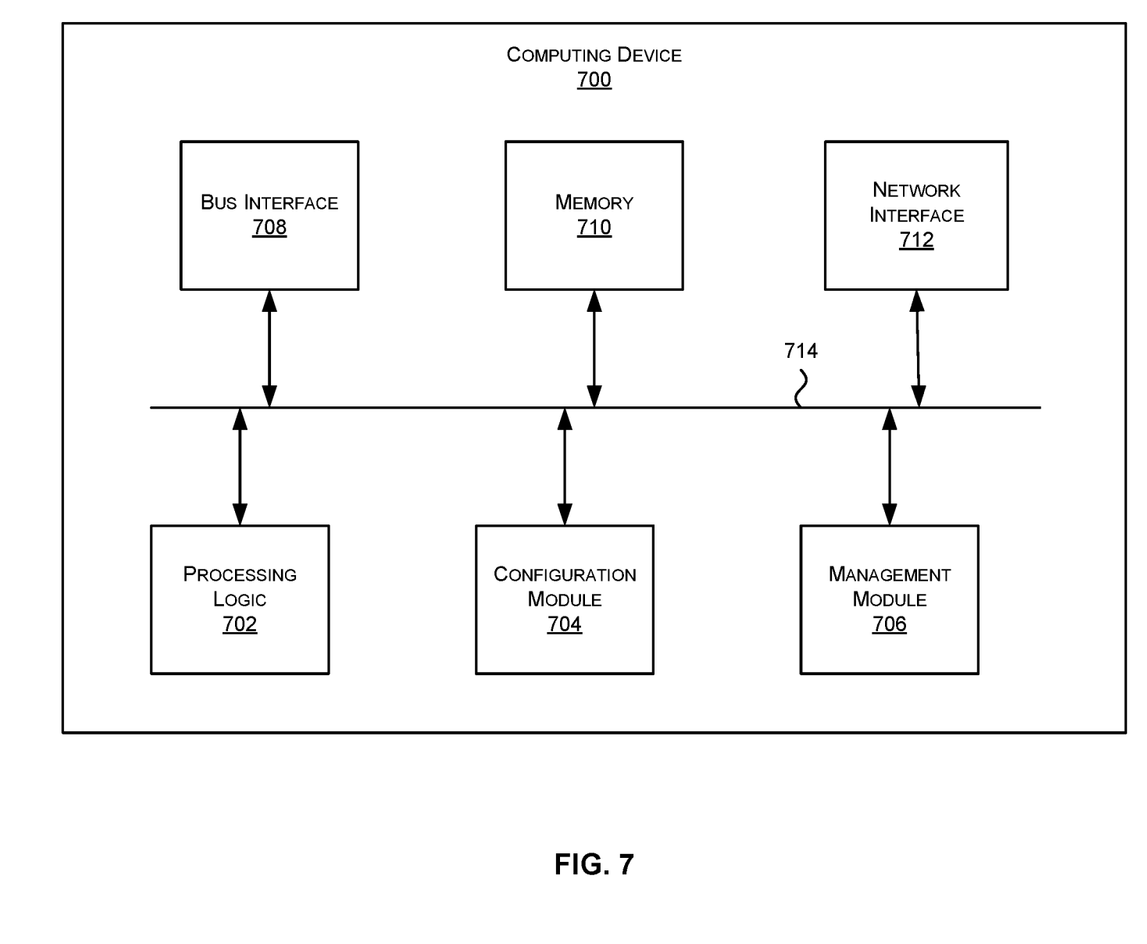
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. The computing device 700 may be an example of D1 104 and/or D2 106. In one example, the computing device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, which are not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory may also store and maintain several data structures and routing tables for facilitating the functionality of the computing device 700.

In some implementations, the configuration module 704 may include one or more configuration registers. Configuration registers may control the operations of the computing device 700. In some implementations, one or more bits in the configuration register can represent certain capabilities of the computing device 700. Configuration registers may be programmed by instructions executing in the processing logic 702, and/or by an external entity, such as a host device, an operating system executing on a host device, and/or a remote device. The configuration module 704 may further include hardware and/or software that control the operations of the computing device 700.

In some implementations, the management module 706 may be configured to manage different components of the computing device 700. In some cases, the management module 706 may configure one or more bits in one or more configuration registers at power up, to enable or disable certain capabilities of the computing device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems that are not shown here.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
a processor; and
one or more memories storing code that, when executed by the processor, causes the integrated circuit device to act as a first device to perform operations including:
sending a first digital certificate of the first device (D1(cert-1)) to a second device, the D1(cert-1) generated by a boot process for the first device;
receiving a first digital certificate of the second device (D2(cert-1)) from the second device, the D2(cert-1) generated by a boot process for the second device;
generating a second digital certificate of the first device (D1(cert-2)) based on the received D2(cert-1);
receiving a second digital certificate of the second device (D2(cert-2)) from the second device that is generated by the second device based on the D1(cert-1);
verifying the D2(cert-2) based on the D2(cert-1); and
establishing a secure link with the second device using the D2(cert-2).

2. The integrated circuit device of claim 1, wherein the D1(cert-1) includes boot measurement data of the boot process for the first device and represents an identity of the first device, and the D2(cert-1) includes boot measurement data of the boot process for the second device and represents an identity of the second device.

3. The integrated circuit device of claim 2, wherein the D1(cert-2) is an extension to the D1(cert-1) in a certificate chain of the first device, and wherein the D2(cert-2) is an extension to the D2(cert-1) in a certificate chain of the second device.

4. The integrated circuit device of claim 3, wherein the boot measurement data in the boot process for the first device is stored in a measurement register, and wherein the measurement register is used by a central management entity for remote attestation.

5. The integrated circuit device of claim 1, wherein the D1(cert-1) includes a first public key of the first device (D1(pub-K1)), and is signed by a first private key of the first device (D1(pvt-K1)).

6. The integrated circuit device of claim 5, wherein the D1(cert-2) is also signed by the D1(pvt-K1).

7. The integrated circuit device of claim 5, wherein the D1(pub-K1) is used by a central management entity to authenticate the first device.

8. The integrated circuit device of claim 5, wherein the operations further include deleting the D1(pvt-K1) after generating the D1(cert-2) and before establishing the secure link with the second device.

9. The integrated circuit device of claim 5, wherein the D1(cert-2) includes a second public key of the first device (D1(pub-K2)), and wherein the second device verifies the D1(cert-2) based on the D1(cert-1).

10. The integrated circuit device of claim 1, wherein establishing the secure link with the second device includes using a second public key of the second device (D2(pub-K2)) in the D2(cert-2) as a based key for a key exchange protocol.

11. The integrated circuit device of claim 1, wherein the first device is a first system-on-a-chip, and the second device is a second system-on-a-chip.

12. The integrated circuit device of claim 1, wherein the first device is a first component in a system-on-a-chip, and the second device is a second component in the system-on-a-chip.

13. A non-transitory computer readable medium having stored therein instructions that, when executed by one or more processors of a first device, cause the first device to perform operations including:
sending a first digital certificate of the first device (D1(cert-1)) to a second device, the D1(cert-1) generated by a boot process for the first device;
receiving a first digital certificate of the second device (D2(cert-1)) from the second device, the D2(cert-1) generated by a boot process for the second device;
generating a second digital certificate of the first device (D1(cert-2)) based on the received D2(cert-1);
receiving a second digital certificate of the second device (D2(cert-2)) from the second device that is generated by the second device based on the D1(cert-1);
verifying the D2(cert-2) based on the D2(cert-1); and
establishing a secure link with the second device using the D2(cert-2).

14. The non-transitory computer readable medium of claim 13, wherein the D1(cert-1) includes a first public key of the first device (D1(pub-K1)), and is signed by a first private key of the first device (D1(pvt-K1)).

15. The non-transitory computer readable medium of claim 14, wherein the D1(cert-2) is also signed by the D1(pvt-K1).

16. The non-transitory computer readable medium of claim 14, wherein the D1(pub-K1) is used by a central management entity to authenticate the first device.

17. The non-transitory computer readable medium of claim 14, wherein the operations further include deleting the D1(pvt-K1) after generating the D1(cert-2) and before establishing the secure link with the second device.

18. The non-transitory computer readable medium of claim 14, wherein the D1(cert-2) includes a second public key of the first device (D1(pub-K2)), and wherein the second device verifies the D1(cert-2) based on the D1(cert-1).

19. The non-transitory computer readable medium of claim 18, wherein the second public key of the first device (D1(pub-K2)) is generated by a cryptographic process based on a first public key of the second device (D2(pub-K1)).

20. The non-transitory computer readable medium of claim 19, wherein establishing the secure link with the second device includes using a second public key of the second device (D2(pub-K2)) in the D2(cert-2) as a based key for a key exchange protocol.

\* \* \* \* \*